United States Patent [19]

Pytlewski et al.

[11] Patent Number: 4,602,994

[45] Date of Patent: Jul. 29, 1986

[54] REMOVAL OF PCBS AND OTHER HALOGENATED ORGANIC COMPOUNDS FROM ORGANIC FLUIDS

[75] Inventors: Louis L. Pytlewski, Philadelphia, Pa.; Frank J. Iaconianni, Cherry Hill, N.J.; Kenneth Krevitz, Philadelphia, Pa.; Arthur B. Smith, Newark, N.J.

[73] Assignee: The Franklin Institute, Philadelphia, Pa.

[21] Appl. No.: 544,873

[22] Filed: Oct. 24, 1983

Related U.S. Application Data

[63] Continuation-in-part of Ser. No. 429,096, Sep. 30, 1982, Pat. No. 4,417,977.

[51] Int. Cl.[4] .................. C10G 17/00; C10G 29/06; C07C 7/148; C07C 39/12
[52] U.S. Cl. .................................. 208/262; 210/909; 252/581; 585/469
[58] Field of Search .................. 208/262; 252/581; 210/909; 585/469

[56] References Cited

U.S. PATENT DOCUMENTS

| | | | |
|---|---|---|---|
| 1,995,568 | 3/1935 | Jacobi et al. | 260/154 |
| 1,996,744 | 4/1935 | Britton | 260/154 |
| 2,448,092 | 9/1944 | Gibson | 260/683.4 |
| 2,449,088 | 9/1948 | Smith | 280/396 |
| 2,914,558 | 11/1959 | Cooper | 260/521 |
| 3,075,021 | 1/1963 | Luvisi et al. | 260/650 |
| 3,188,357 | 6/1965 | Blumbergs | 260/655 |
| 3,239,568 | 3/1966 | De Pree et al. | 260/632 |
| 3,243,464 | 3/1966 | Parvi | 260/620 |
| 3,413,341 | 11/1968 | Bursack et al. | 260/521 |
| 3,595,931 | 7/1971 | Hay et al. | 260/668 |
| 3,686,332 | 8/1972 | Chang | 260/650 |
| 3,726,929 | 4/1973 | Payne et al. | 260/623 |
| 3,891,717 | 6/1975 | Gilbert et al. | 260/623 |
| 3,968,177 | 7/1976 | Kaufhold et al. | 260/638 |
| 4,001,340 | 1/1977 | Smith et al. | 260/620 |
| 4,225,731 | 9/1980 | Marhold et al. | 568/775 |
| 4,284,516 | 8/1981 | Parker et al. | 210/757 |
| 4,301,083 | 11/1981 | Yoshimura et al. | 260/404 |
| 4,326,090 | 4/1982 | Smith et al. | 585/469 |
| 4,327,027 | 4/1982 | Howard et al. | 270/340.3 |
| 4,353,793 | 10/1982 | Brunelle | 208/262 |
| 4,377,471 | 3/1983 | Brown et al. | 208/262 |
| 4,379,746 | 4/1983 | Norman et al. | 208/262 |

FOREIGN PATENT DOCUMENTS

| | | | |
|---|---|---|---|
| 1930341 | 12/1970 | Fed. Rep. of Germany | 568/730 |
| 255880 | 7/1926 | United Kingdom . | |
| 1068832 | 5/1932 | United Kingdom . | |
| 618189 | 2/1949 | United Kingdom | 570/226 |
| 1045298 | 10/1966 | United Kingdom | 568/710 |
| 1221019 | 2/1976 | United Kingdom | 568/796 |

OTHER PUBLICATIONS

A. Oku et al., Chemistry and Industry, pp. 841–842 (Nov. 1978).
Liggett, Analytical Chemistry, vol. 26, No. 4, pp. 748–750 (1954).
Pytlewski et al., 11th Mid-Atlantic Industrial Wastes Conference Jul. 15–17, 1979.
Pytlewski et al., publication for EPA, 1980.
Furukawa et al., Markromol Chemistry, vol. 38, pp. 244–247 (1960).
Toke et al., Acta Chim. Acad. Sci. Hung., vol. 93(3–4), pp. 421–424 (1977).
Toke et al., Acta Chim. Acad. Sci. Hung., vol. 100(1–4), pp. 257–264 (1979).
W. H. Dennis et al., Bulletin of Environmental Contamination and Toxicology, vol. 14, No. 6, pp. 736–744 (1975).
P. Johncock et al., Analytical Chemistry, vol. 94, pp. 245–247 (1959).

*Primary Examiner*—Paul Lieberman
*Assistant Examiner*—Robert A. Wax
*Attorney, Agent, or Firm*—Dann, Dorfman, Herrell and Skillman

[57] ABSTRACT

Organic functional fluids containing halogenated organic compounds present as contaminants therein are treated in an inert atmosphere with a NaPEG decomposition reagent which is prepared in an inert atmosphere, thereby to produce a functional fluid phase substantially free of the halogenated organic compound and a reagent residue phase containing a derivative of the contaminant having a reduced halogen content. The latter may be further dehalogenated by reacting the reagent residue with a NaPEG reagent in the presence of oxygen.

17 Claims, No Drawings

REMOVAL OF PCBS AND OTHER HALOGENATED ORGANIC COMPOUNDS FROM ORGANIC FLUIDS

This application is a continuation-in-part of Ser. No. 429,096, filed Sept. 30, 1982 now U.S. Pat. No. 4,417,977.

BACKGROUND OF THE INVENTION

The present invention relates generally to a method for removing halogenated organic compounds from organic fluids containing same and more particularly to a method for removing polychlorinated aromatic compounds from functional fluids contaminated therewith, including especially contaminated transformer oil.

The potential hazard to health and the environment posed by synthetic halogen-containing organic chemicals is well known. Compounds such as polychlorinated biphenyls (PCBs), dichlorodiphenyltrichloroethane (DDT), decachlorooctahydro-1,3,4-metheno-2H-cyclobuta-[c,d]-pentalen-2-one (Kepone ®), and 2,4,5-trichlorophenoxyacetic acid, (2,4,5-T), although having demonstrated utility, have been found to be persistent environmental toxins which require safe and effective means of disposal.

Halogenated organic compounds present a difficult disposal problem because of the highly stable nature of the carbon-halogen bonds present therein. The bond energy of a carbon-chlorine bond, for example, is on the order of eighty-four kcal./mole. Thus, many halogenated organic compounds are not only resistant to biodegradation, they cannot be degraded in a practical and effective manner by any of the well known chemical decomposition methods. In most cases, known detoxifying methods such as chlorolysis, catalytic dehydrohalogenation, molten salt reactions, ozone reactions and alkali metal reduction achieve only partial dehalogenation. Moreover, these prior art methods typically involve one or more drawbacks, such as the use of expensive reagents, extensive temperature control, inert atmospheres, complex apparatus, substantial energy consumption and the like.

A particularly troublesome problem is presented when the halogenated organic compound is present as a contaminant in an otherwise useful functional fluid. PCBs, for example, were once widely used as a dielectric fluid in electrical equipment such as transformers and capacitors because of their excellent insulating properties. In 1977, however, all production of PCBs was stopped due to their cumulative storage in human fatty tissue and reports of extremely high toxicity. PCBs were replaced as a dielectric fluid with other less harmful substances. These latter substances have since been found to contain residual amounts of PCBs therein. Consequently, the maintenance, operation and disposal of PCB-contaminated transformers and transformer oil is now strictly regulated.

Since the production ban on PCBs, incineration has probably been the most widely used method for destroying PCBs and PCB-contaminated materials. Disposal by incineration is decidedly wasteful, however, since potentially recyclable materials associated with the PCBs, such as functional fluids, are destroyed in the process. To avoid such waste, methods have been proposed whereby PCB-contaminated materials in particular would be treated with an adsorbent, e.g., by passing the material through a bed of activated charcoal or resin to selectively remove the PCBs from said material. Although PCBs are physically removed from the recyclable material in this manner, the disposal of adsorbed PCBs still remains a problem.

During the past several years, there has been developed at the Franklin Research Center of the Franklin Institute, Philadelphia, Pa., a system for stripping the chlorine substituents from various halogenated organic compounds, including PCBs, thus rendering them non-toxic and readily disposable. More specifically, Pytlewski, Krevitz and Smith, in their U.S. patent application Ser. No. 158,359, filed June 11, 1980, now U.S. Pat. No. 4,337,368, disclose and claim a method for the decomposition of halogenated organic compounds, which represents a significant advance over the aforementioned decomposition methods of the prior art. The decomposition reagent used in practicing the method of Pytlewski et al. is formed from the reaction between an alkali metal, a liquid reactant, such as polyglycol or a polyglycol monoalkyl ether, and oxygen. This reagent produces virtually complete dehalogenation simply by mixing it with the halogenated compound in the presence of oxygen.

In U.S. patent application Ser. No. 240,622, filed Mar. 5, 1981, now U.S. Pat. No. 4,400,552, there is described and claimed another invention by Pytlewski et al. based on the discovery that decomposition of halogenated organic compounds may be carried out using a reagent produced by the reaction of an alkali metal hydroxide (rather than an alkali metal), a liquid reactant, such as a polyglycol or a polyglycol monoalkyl ether, and oxygen. This decomposition reagent gives results which are comparable to those obtained with the method described in the earlier filed application of Pytlewski et al. referred to above.

The decomposition reagents of the aforesaid patent applications are collectively referred to hereinafter as NaPEG reagents, or NaPEG—O, signifying that the reagent was prepared in a reaction mixture to which oxygen was introduced.

The development of the NaPEG reagents has made it possible to remove various halogenated organic compounds, including PCBs, from fluids contaminated therewith, as well as to decompose such compounds in concentrated form in a safe, efficient and effective manner. However, as disclosed in the aforementioned patent applications, it was believed, prior to the present invention, that in order for the NaPEG reagents to be effective in decomposing halogenated organic compounds they had to be prepared using oxygen and used in the presence of oxygen.

SUMMARY OF THE INVENTION

It has now been found, in accordance with the present invention, that in treating functional fluids for the removal of halogenated contaminants, such as in the detoxification of PCB-containing transformer oil, particularly good results are obtained when the NaPEG reagent is prepared in an inert atmosphere, and the functional fluid is treated in an inert atmosphere with the NaPEG reagent thus produced.

By treating the functional fluid in this manner, there is formed a derivative of the halogenated organic compound having a reduced halogen content. The derivative of the halogenated organic compound is formed simply by vigorous mixing of the fluid containing the halogenated organic compound with the NaPEG reagent under reactive conditions in an inert atmosphere.

In general, the spent reagent or reagent residue (i.e. NaPEG reaction products and any unreacted NaPEG left after reaction) is substantially immiscible with the functional fluid, and the solubility characteristics of the reagent residue and the derivative of the halogenated organic compound are such that the derivative is more soluble in the reagent residue than in the functional fluid. The mixture thereafter separates into a two-phase system comprising a functional fluid phase substantially free of halogenated organic compounds and a NaPEG reagent residue phase containing the derivative of the halogenated compound. Thus, it has now been determined that it is not necessary to achieve complete dehalogenation in order to render a functional fluid contaminated with halogen-containing organic compounds substantially free of such contaminants.

The expression "derivative of the halogenated compound" refers to a halogenated organic compound whose halogen substituents have been replaced in part, or in whole, by substituents resulting from reaction with the NaPEG decomposition reagent.

Nitrogen, helium, or argon may be used to provide the inert atmosphere in performing the present method, nitrogen being preferred because of its relatively low cost and ready availability. Of course, other inert atmospheres may also be employed in practicing the invention.

If necessary, the derivative of the halogenated compound present in the reagent residue may be reacted further with a NaPEG reagent in the presence of oxygen to effect substantially complete dehalogenation of the starting halogenated organic compound. The principal products of this reaction are sodium chloride and various oxygenated derivatives of the starting halogenated organic compound. These latter substances are easily disposable under environmentally safe conditions.

In addition to providing an efficient and effective way for removing substantially all of the halogenated organic contaminant from a functional fluid containing same, this improved method possesses other notable advantages. For example, as in the earlier decomposition methods using the NaPEG reagents, it does not require highly specialized equipment or involve extreme operating conditions. The production of the halogenated organic compound derivative is accomplished by merely reacting the NaPEG reagent with the halogenated organic compound present in the functional fluid under an inert atmosphere. Moreover, it has been found that the aforesaid derivative formed as a result of this reaction will, when further treated with NaPEG and oxygen, react more quickly to form a substantially completely dehalogenated product, than would the starting halogenated organic compound. This is believed due to the electron configuration modification of the halogenated organic compound which occurs during formation of the derivative. Therefore, when the derivative present in the reagent residue is subjected to further decomposition treatment, such as reaction with NaPEG—O reagent in oxygen, substantially complete dehalogenation of the derivative occurs quite rapidly.

Another significant advantage of the present invention is that it obviates repeated aqueous extractions with an aqueous extraction medium to remove the decomposition products from the functional fluid as is required in some prior art processes in which complete dehalogenation of the halogenated organic compound occurs in the functional fluid. In the method of the present invention, functional fluid substantially free of halogenated organic contaminants is obtained in a treatment, which, in effect, involves only a single extraction.

The use of an inert atmosphere in producing the NaPEG reagent and in decomposing the halogenated organic contaminants in the functional fluid undergoing treatment provides additional advantages. For example, when the NaPEG reagent is prepared in air, as had previously been done, the reagent takes on water, which interferes with separation of the functional fluid from the spent reagent. Preparation of the NaPEG in nitrogen (NaPEG—N), for example, substantially eliminates this problem. In addition, oxygen, water and carbon dioxide tend to react with the decomposition reagent, particularly above room temperature. Hence, the exclusion of air during treatment of the contaminated functional fluid allows more efficient use of the reagent. Furthermore, the exclusion of oxygen is beneficial in large scale processing for contaminant removal where temperatures in excess of the flash point of the functional fluid are desirable. Unlike our earlier NaPEG—O preparation and decomposition methods, a closed system is required in practicing the method of the present invention.

DESCRIPTION OF THE INVENTION

Any of the alkali metals or alkali metal hydroxides may be used in preparing the NaPEG reagent. Lithium, sodium, and potassium, or their hydroxides, are preferred because of their ready availability and relatively low cost. Of these, sodium or sodium hydroxide is particularly preferred because it is less expensive than the others and produces a highly reactive reagent. Alloys of different alkali metals or mixtures of alkali metal hydroxides may be used if desired. An eutectic of sodium and potassium may be conveniently used because it is liquid under the conditions normally used to prepare the decomposition reagent.

The other reactant required for the production of the decomposition reagent is a compound having the general formula:

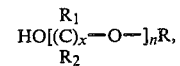

wherein R is hydrogen or lower alkyl, $R_1$ and $R_2$ are the same or different and are selected from the group consisting of hydrogen, unsubstituted or substituted lower alkyl, unsubstituted or substituted cycloalkyl having from 5 to 8 carbon atoms, and unsubstituted or substituted aryl, n has a value from about 2 to about 400, and x has a value of at least 2, which includes polyglycols and polyglycol monoalkyl ethers. The lower alkyl radical in the foregoing formula may be methyl, ethyl, propyl, isopropyl, butyl or isobutyl. The cycloalkyl radical may be cyclopentyl, cyclohexyl, cycloheptyl, and cyclooctyl. The aryl radical may be phenyl, benzyl, biphenyl or naphthyl. The substituents on the $R_1$ and $R_2$ radicals include, but are not limited to, lower alkyl, e.g. methyl, ethyl, propyl, butyl, and isobutyl; halo, e.g. chloro or bromo; nitro, sulfato; carboxyl; amino; mono- and di-lower-alkyl amino, e.g. methylamino, ethylamino, dimethylamino or methylethylamino; amino; hydroxy; and lower alkoxy, e.g. methoxy or ethoxy.

Suitable reactants falling within the above formula include diethylene glycol, diethylene glycol monoethyl ether, polyether glycols, such as polyethylene glycols, polypropylene glycols and polybutylene glycols and related long chain glycol monoalkyl ethers. The preferred reactants are those of the above general formula wherein $R_1$ and $R_2$ are hydrogen and x is 2. Particularly preferred are polyethylene glycols, i.e. polymers of formula $HO[CH_2-CH_2-O]_nH$, having an average molecular weight range from about 100 to about 20,000. The above described reactants may be either liquids or solids. Those which are solids, e.g. the high molecular weight polyethylene glycols, should be melted before preparation of the decomposition reagent is begun. Neither low volatility, non-polar liquids, nor glycolic liquids in which both terminal hydroxyl groups are alkylated has been found to produce the desired dehalogenation.

The term "polyglycols", as used herein, refers to polymers of dihydric alcohols.

The reaction for producing the reagent proceeds spontaneously at room temperature simply by mixing the reactants in a closed reaction vessel under an inert atmosphere, preferably with stirring.

The decomposition reagents are basic substances possessing polyethylene glycol moieties $(CH_2CH_2-O)_n$ and hydroxyls (OH). These are ideal chemical structures for the solvation of metal cations, which serves to activate the basic species. Moreover, these decomposition reagents are highly soluble in, or miscible with halogenated organic compounds such as PCBs.

The method of the present invention may be practiced on various functional fluids contaminated with widely varying amounts of halogenated organic compounds. It is particularly useful for removing halogenated organic compounds, such as PCBs, from either non-polar fluids, such as transformer oils, or relatively aprotic polar fluids, such as dimethylformamide, dimethyl sulfoxide, N-methyl-2-pyrrolidone, various ethers, and the like. Although the present invention may be practiced on protic polar fluids, it would require much more of the dehalogenation reagent to achieve the desired results due to reaction of the protic polar fluid with the dehalogenating reagent itself. A more economical approach is to extract the halogenated organic compound from the protic polar fluid using a non-polar extractant such as hexane. The contaminated extractant containing the halogenated organic compound could then be treated according to the method of the present invention.

In order to produce a derivative of the halogenated organic contaminant and remove the same from the functional fluid in accordance with this invention, all that is necessary is to mix vigorously the contaminated fluid with the NaPEG reagent in an inert atmosphere under reactive conditions. The mole ratio of NaPEG to halogenated organic substance will depend on whether the present method is practiced on a halogenated organic compound in relatively concentrated form or a functional fluid which is contaminated with a halogenated organic compound. When practiced on a halogenated organic compound in concentrated form the mole ratio of NaPEG to halogen atoms present in the halogenated organic compound should be about one to one, or greater. When practiced on a functional fluid contaminated with a relatively small amount, e.g. ppm, of halogenated organic compound, the appropriate ratio of NaPEG to halogen atoms present may be empirically determined, however, a ratio of 10 moles NaPEG per mole of contaminated fluid has been found to be effective in treating a broad range of halogenated organic compound concentrations.

While the partial dehalogenation reaction will occur at room temperature, the mixture may be heated to speed the rate of reaction. Heating to a temperature in the range of about 25° C. to 125° C. has been found to produce satisfactory results when PCBs were the halogenated compound, and a dielectric fluid or transformer oil was the functional fluid. Of course, the temperature may vary depending upon the nature of the reagent used, the halogenated organic compound being removed, and the functional fluid in which the halogenated organic compound is present.

Although the reaction mechanism on which the present invention is based is not completely understood, it is believed that the halogens removed in forming the derivative of the halogenated organic compound are replaced by oxygenated groups such as ethers and/or hydroxyls. The derivative is therefore thought to be more polar than the starting halogenated organic compound, and thus, more soluble in the reagent residue and less soluble in the functional fluid. Consequently, the process results in extraction of the derivative from the functional fluid into the reagent residue.

After treatment of the functional fluid with the NaPEG reagent under the conditions referred to above, the mixture is allowed to separate into a two-phase system comprising a reagent residue phase containing the derivative of the halogenated organic compound and a functional fluid phase substantially free of halogenated organic compounds which may then be drawn off, e.g. by decantation, and reused.

It will be appreciated from the foregoing description that the above-described decomposition reagent performs two functions. First, it reacts with the halogenated organic compound in an inert atmosphere to produce a halogenated organic compound derivative of reduced halogen content. Second, it acts as an extractant, extracting the derivative from the functional fluid.

Performing the treatment of contaminated functional fluid with NaPEG in an inert atmosphere generally results in the formation of a partially dehalogenated derivative, rather than in substantially complete dehalogenation of the halogenated organic compound, as in the earlier NaPEG—O decomposition processes. The inert atmosphere provides an appropriate environment for partial dehalogenation. In order to render the contaminants removed from the functional fluid nontoxic, further treatment may be required, as, for example, where the fluid is contaminated with PCBs. As disclosed in the aforementioned patents, reacting a halogenated organic compound with NaPEG—O in the presence of oxygen effects substantially complete dehalogenation of the halogenated organic compound and forms an oxygenated derivative of said compound. It has been found that the derivative of the halogenated organic compound formed in carrying out the present invention is more reactive with oxygen and NaPEG reagent than the starting halogenated organic compound. For instance, PCBs from which one or two chlorines have been removed react with NaPEG reagent in the presence of oxygen very rapidly to form an oxygenated biphenyl derivative. The reaction for producing complete dehalogenation proceeds readily by stirring the reactants in an open reaction vessel. It is unnecessary to bubble oxygen or air into the reaction vessel, since satisfactory results are obtained when decomposition is carried out in air. Further treatment of the derivative of reduced halogen content may include the use of known detoxification methods, other than the use of NaPEG reagent, as described above.

The oxygenated derivatives obtained from the further decomposition treatment are readily recovered and may be converted into useful products, e.g. polymer starting materials, anti-oxidants and plasticizers, by procedures well known to those skilled in the art. Considering that reusable products may be obtained from the invention as disclosed herein, at least a portion of the operating costs of the present method should be recoupable.

Representative halogenated organic compounds present in functional fluids which can be partially dehalogenated and removed therefrom in accordance with the present invention are: hexachlorocyclohexene, hexachlorobenzene, trichlorobenzene, tetrachlorobenzene, dichlorophenol, pentachlorophenyl, dichlorodiphenyltrichloroethane, decachlorooctahydro-1,3,4-metheno-2H-cylobuta-[c,d]pentalen-2-one and polychlorinated biphenyl.

The invention will be further understood by reference to the following examples, which are intended to illustrate, and not to limit the invention.

EXAMPLE I

Preparation of NaPEG Under Nitrogen 90 gms. of metallic sodium (Na) was added in portions to 1500 gms. of polyethylene glycol (PEG), having an average molecular weight of 400, under nitrogen ($N_2$) at about 100° C. The product, NaPEG—N, was a viscous straw-colored liquid, containing no visible undissolved sodium.

EXAMPLE II

Treatment of PCBs With NaPEG—N 25 gms. of the NaPEG—N produced in Example I was mixed with 2 gms. of Inerteen ® and reacted at about 140° C. for about two hours under nitrogen ($N_2$). The reaction products were analyzed and it was determined that a 45.7% dechlorination of the Inerteen ® had been achieved. This represents a sufficient reduction in the chlorine content to render the partially dehalogenated Inerteen ® more soluble in the reagent residue, then in a transformer oil. Inerteen ® is a brand of polychlorinated biphenyls formerly manufactured by Westinghouse, and used as a dielectric fluid in electrical equipment, such as transformers.

As those skilled in the art will appreciate, the present invention provides a very effective and efficient way of removing halogenated organic compounds from otherwise useful fluids, and recycling such fluids.

While the method herein described constitutes a preferred embodiment of the invention, it is to be understood that the invention is not limited to the precise embodiment of the described method, but that changes may be made herein without departing from the spirit and scope of the invention, as set forth in the appended claims.

What is claimed is:

1. A method for the removal of a halogenated organic compound from an organic fluid containing said compound, comprising the steps of:
    (a) providing a decomposition reagent comprising the product of the reaction of a first reactant selected from the group consisting of an alkali metal, or alloys of said metals, or an alkali metal hydroxide or mixtures of said hydroxides, a second reactant having the general formula

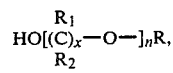

wherein R is hydrogen or lower alkyl, $R_1$ and $R_2$ are the same or different and are selected from the group consisting of hydrogen, unsubstituted or substituted lower alkyl, unsubstituted or substituted cycloalkyl having from 5 to 8 carbon atoms, and unsubstituted or substituted aryl, n has a value from about 2 to about 400 and x has a value of at least 2, said reaction being carried out in an inert atmosphere;
    (b) mixing said reagent with said fluid containing said halogenated compound in an inert atmosphere under reactive conditions to form a derivative of said halogenated organic compound, having a reduced halogen content, and a reagent residue, the reagent residue being substantially immiscible with said fluid, and said derivative being more soluble in said reagent residue than in said fluid;
    (c) allowing said mixture to separate into a two-phase system comprising a reagent residue phase containing said derivative and a fluid phase substantially free of said halogenated compound; and
    (d) separating said reagent residue phase from said fluid phase.

2. The method of claim 1, wherein the decomposition reagent is produced and the derivative of the organic halogenated compound is formed in an inert atmosphere selected from the group consisting of nitrogen, helium or argon.

3. The method of claim 2, wherein (i) said decomposition reagent is formed from a first reactant selected from the group consisting of lithium, sodium, potassium, or the hydroxides of said metals, or alloys of said metals, or mixtures of said hydroxides, and a second reactant having the formula set forth in claim 1 wherein $R_1$ and $R_2$ are hydrogen and x is 2, and (ii) said halogenated organic compound is selected from the group consisting of hexachlorocyclohexane, hexachlorobenzene, trichlorobenzene, tetrachlorobenzene, dichlorophenol, pentachlorophenol, dichlorodiphenyltrichloroethane, decachlorooctahydro-1,3,4-metheno-2H-cyclobuta-[c,d]-pentalen-2-one and polychlorinated biphenyl.

4. The method of claim 3, wherein said first reactant is sodium and said second reactant is polyethylene glycol.

5. The method of claim 4, wherein the halogenated organic compound is polychlorinated biphenyl.

6. The method of claim 3, wherein said first reactant is potassium and said second reactant is polyethylene glycol.

7. The method of claim 6, wherein the halogenated organic compound is polychlorinated biphenyls.

8. The method of claim 3, wherein said first reactant is a sodium-potassium alloy and said second reactant is polyethylene glycol.

9. The method of claim 8, wherein the halogenated organic compound is polychlorinated biphenyl.

10. The method of claim 1, wherein the fluid containing said halogenated organic compound comprises a non-polar fluid in which said halogenated organic compound is miscible.

11. The method of claim 10, wherein said non-polar fluid comprises a hydrocarbon-based oil.

12. The method of claim 1, wherein said fluid containing said halogenated organic compound comprises an aprotic polar fluid in which said halogenated compound is miscible.

13. The method of claim 1, including the step of further treating said derivative of reduced halogen content in said reagent residue phase with a detoxification agent to effect substantially complete dehalogenation of said derivative.

14. The method of claim 13, wherein said further treatment comprises reacting said derivative of reduced halogen content in the presence of oxygen with a detoxification agent formed from a first reactant selected from the group consisting of lithium, sodium, potassium, or the hydroxides of said metals, or alloys of said metals, or mixture said hydroxides, a second reactant having the formula set forth in claim 1 wherein $R_1$ and $R_2$ are hydrogen and x is 2, and oxygen as a third reactant.

15. The method of claim 14, wherein said first reactant is sodium and said second reactant is polyethylene glycol.

16. The method of claim 14, wherein said first reactant is potassium and said second reactant is polyethylene glycol.

17. The method of claim 14, wherein said first reactant is an alloy of sodium and potassium and said second reactant is polyethylene glycol.

* * * * *